United States Patent [19]

Lier et al.

[11] Patent Number: 6,163,296

[45] Date of Patent: Dec. 19, 2000

[54] CALIBRATION AND INTEGRATED BEAM CONTROL/CONDITIONING SYSTEM FOR PHASED-ARRAY ANTENNAS

[75] Inventors: Erik Lier; Daniel Sanford Purdy, both of Newtown, Pa.; Gregory Michael Kautz, Burnt Hills, N.Y.

[73] Assignee: Lockheed Martin Corp., Sunnyvale, Calif.

[21] Appl. No.: 09/352,509

[22] Filed: Jul. 12, 1999

[51] Int. Cl.[7] ............................. G01S 5/02; G01S 13/00
[52] U.S. Cl. ..................... 342/417; 342/154; 342/174; 342/372
[58] Field of Search ............................. 342/81, 154, 174, 342/354, 372, 373, 417

[56] References Cited

U.S. PATENT DOCUMENTS

| | | | |
|---|---|---|---|
| 3,818,478 | 6/1974 | Groginsky | 343/106 R |
| 4,292,637 | 9/1981 | Johnson | 343/6.5 SS |
| 4,306,236 | 12/1981 | Johnson | 343/14 |
| 5,790,071 | 8/1998 | Silverstein et al. | 342/354 |

*Primary Examiner*—Thomas H. Tarcza
*Assistant Examiner*—Dao L. Phan
*Attorney, Agent, or Firm*—W. H. Meise

[57] ABSTRACT

A near-field calibration arrangement for an antenna array determines the phase shifts or attenuation of the elemental control elements of the array. The calibration system includes a probe located in the near field, and a calibration tone generator. The tone generator is coupled to the probe in the case of calibration of a receive antenna, and to the signal port of the array in the case of calibration of a transmit antenna. A code generator generates sets of values, with each set being orthogonal to the others. The codes are applied to the control input port of the array antenna, so that the codes encode the tone passing through the antenna. The encoded tones are applied to a decoder and processor, which processes the signals to determine the phase shift or attenuation associated with each bit of the control signal. A transmit antenna attitude determination or pointing arrangement uses the calibration tone generator in conjunction with a plurality of remote sites.

4 Claims, 6 Drawing Sheets

CALIBRATION AND INTEGRATED BEAM CONTROL/CONDITIONING SYSTEM FOR PHASED-ARRAY ANTENNAS

FIELD OF THE INVENTION

This invention relates to a method for determining the attitude or beam pointing direction of a phased-array antenna which includes a calibration arrangement for the elements of the antenna array.

BACKGROUND OF THE INVENTION

Antenna arrays are well known, and are finding increasing use. Active antenna arrays which switch from transmit to receive modes, for use in systems such as radar, include both power amplifiers and low-noise receivers, and some method for switching from transmit mode to receive mode. This mode of operation is advantageous in that it allows the antenna elements themselves, and possibly the control elements, including the phase shifters and the attenuators (or amplifier gains), to be used for both the transmit and receive modes of operation.

In some applications, such as repeaters, the signals which must be handled are continuously received, and must be continuously retransmitted. For repeater use, active antenna arrays which switch from transmit to receive operation are not useful, for they must give up one of transmission or reception while performing the other function.

In critical applications, there must be some way to align the antenna beam(s) of an array antenna. The alignment is performed by controlling the phase shifters and or attenuators associated with each antenna element or group of antenna elements in such a manner as to generate the desired beam shape and direction. Antenna controllers, also known as Antenna Control Units (ACU) which provide such control are also well known. In digitally controlled systems, the phase shifters and the attenuators (which may include gain control of an amplifier) are controlled by digital signals. The smallest unit of control which can be achieved in a digital system is defined by a one-bit change in the signal. The phase change provided by a phase shifter, and the attenuation change provided by an attenuator, are controlled by a multibit control signal, as for example a five-bit control signal, in which any one value represents one of 32 possible states. When the number of bits of the control signal is so limited, the corresponding change in control provided by the phase shifter or attenuator is usually the maximum available change divided by the number of states represented by the control signal. In the five-bit control signal example, assuming that the maximum possible phase shift provided by a phase shifter is 360°, the smallest increment of control is designed to be 360° divided by 32, or slightly more than 10° per bit.

The actual phase shift of a phase shifter, and the actual attenuation of an attenuator, at a given value of the digital control signal, may deviate from the nominal value. The cumulation of these errors may substantially affect the accuracy with which the ACU can point the beam(s) in the desired direction, and or establish the desired beamshape. For this reason, various calibration schemes have been proposed. In this context, the term "calibration" means the process of determining the (one-to-one) relationship between the phase or amplitude of the input and output signals of a controllable phase shifter or attenuator for a given control input signal state. One simple calibration scheme is to measure the phase shift of each phase shifter, and the attenuation of each attenuator, before it is mounted in the antenna array, and to provide the resulting data to the ACU as an indication of the expected phase or attenuation of the control unit in the presence of a given digital input signal. This type of calibration scheme does not take into account changes which may occur in the performance of the various control elements due to aging, voltage variations which may be experienced, temperature effects, transmission-line impedance effects, and the like.

Improved calibration arrangements are desired.

SUMMARY OF THE INVENTION

An antenna attitude or antenna pointing determination method uses part of a near-field antenna calibration system. The near-field calibration apparatus or system calibrates at least one of (either or both of) the phase and amplitude controllers of the individual elements of a phased-antenna array, which may be either active or passive. The phased-antenna array includes a signal port for each antenna beam which is generated, and also includes a control signal input port to which control signals may be applied for control of the phase and amplitude controllers. The phased-antenna array may be operated in a normal signal-handling mode or in a calibration mode. A calibration probe is held at a fixed location relative to the phased-antenna array, and within the near-field of the phased-antenna array. The term "near-field" as used herein means that the probe is placed nominally in close proximity such that it is effectively co-located with the phased-array antenna. While the term normally is taken to mean a distance no greater than $2D^2/\lambda$, where D is the dimension of the antenna, and $\lambda$ is the free-space wavelength, this distance is really the distance at which phase errors across the antenna aperture are deemed to be insignificant, and this consideration varies with the application. A calibration tone generator generates a calibration tone signal. The calibration tone generator is (a) coupled to at least one of the signal ports of the phased-antenna array for the case in which the phased-antenna array is used as a transmit antenna during normal operation, and or is (b) coupled to the calibration probe for the case in which the phased-antenna array is used as a receive antenna during normal operation. A calibration encoding arrangement is coupled to the beam conditioning control port of the phased-antenna array, for, during calibration, sequentially setting at least some of the phase shifters (or attenuators, or both) of the phased-antenna array with a plurality of sets of values. Each of the sets of values set by the encoding arrangement imposes a coding on the calibration tone signal, to thereby sequentially generate calibration signals encoded with a set of values. Each set of values so encoded onto the calibration signals is orthogonal to other sets of values with which the calibration signals are encoded, so that the individual components of the composite calibration signal can be distinguished. As a result, in the case in which the phased-antenna array is used as a transmit antenna during normal operation, the calibration probe receives the calibration tone signals sequentially encoded with mutually orthogonal values, and in the case in which the phased-antenna array is used as a receive antenna during normal operation, the calibration tone signals sequentially encoded with mutually orthogonal values are generated at the at least one of the signal ports of the phased-antenna array. The calibration system includes a decoder for decoding signals encoded with the mutually orthogonal values, for generating decoded signals therefrom. In one embodiment of the calibration system with which the antenna attitude determination can be used, an encoded signal coupling means is (a) coupled to the calibration probe and to the decoder in the case in which the phased-antenna array is operated as a transmit antenna in the normal mode of operation and (b) coupled to the decoder and to the signal port of the phased-antenna array in the case in which the antenna is operated as a receive antenna in the normal mode of operation, for coupling the encoded signals to the decoder. Consequently, the decoder provides decoded signals. A processor is coupled to the decoder, for processing the decoded signals, for generating signals representing at least values of one of phase shift and attenuation, or both if appropriate. A coupling arrangement is coupled to the processor and to the antenna control unit, for coupling to the antenna control unit the signals representing at least the values of phase shift, attenuation, or both, which may have been determined by the calibration system.

One embodiment of an antenna system which can be used with the antenna attitude or beam pointing method according to a mode of the invention includes an transmit antenna array. The transmit antenna array includes a signal port, and also includes a beam conditioning control input port coupled to at least controllable phase shifters. A transmit calibration probe is at a nominal location in the near field of the transmit array. A transmit antenna switching arrangement including at least common, calibration, and transmit ports, with the common port being coupled to the signal port of the transmit array. A source of transmit antenna array calibration signals is provided. A transmit antenna array calibration signal coupler is coupled to the transmit antenna array calibration signal source and to the calibration port of the transmit switching arrangement, for controllably coupling the transmit antenna array calibration signals to the transmit antenna array, so that the transmit antenna array calibration signal is transmitted by the transmit antenna array. A transmit calibration encoder is coupled to the beam conditioning control port of the transmit antenna, for, during calibration, sequentially setting at least some of the phase shifters of the transmit antenna array with a plurality of sets of values. Each of the sets of values imposes a coding on the transmit antenna array calibration signals, to thereby sequentially generate calibration signals encoded with a set of values, with each set of values so encoded onto the calibration signals being orthogonal to other sets of values with which the calibration signals are encoded. As a result, the transmit antenna array calibration probe receives the transmit antenna array calibration signals sequentially encoded with mutually orthogonal values.

The calibration system with which the antenna attitude determination method may be used may also include a receive antenna array including a signal port and a beam conditioning control input port coupled to at least controllable phase shifters of the receive antenna array. A receive calibration probe is affixed at a location in the near field of the receive array. A receive antenna switching arrangement includes at least common, calibration, and receive ports, with the common port being coupled to the signal port of the receive antenna array. The system also includes a source of receive antenna array calibration signals. A receive antenna array calibration signal coupler is coupled to the receive antenna array calibration signal source and to the receive calibration probe, for controllably coupling the receive antenna array calibration signals to the receive calibration probe. As a result, the receive antenna array calibration signal is transmitted by the receive calibration probe and is received by the receive antenna array. A receive calibration encoder is coupled to the beam conditioning control port of the receive antenna, for, during calibration, sequentially setting at least some of the phase shifters of the receive antenna array with a plurality of sets of values, each of the sets of values thereby imposing a coding on the receive antenna array calibration signals. This, in turn, sequentially generates receive antenna array calibration signals encoded with a set of values. Each set of values so encoded onto the receive antenna array calibration signals is orthogonal to other sets of values with which the receive calibration signals are encoded. Consequently, the receive antenna array receives the receive antenna array calibration signals sequentially encoded with mutually orthogonal values. A transmit/receive calibration switch includes a transmit signal port, a receive signal port, and a common port, for coupling signals applied to either (one of) the transmit signal port or (and) the receive signal port to the common port. A first coupler is coupled to the transmit calibration probe and to the transmit signal port of the transmit/receive calibration switch, for coupling the transmit antenna array calibration signals sequentially encoded with mutually orthogonal values to the transmit/receive calibration switch, whereby the transmit antenna array calibration signals sequentially encoded with mutually orthogonal values are produced at the common port of the transmit/receive calibration switch in a transmit antenna array calibration mode of operation. A second coupler is coupled to the calibration port of the receive antenna switching arrangement and to the receive signal port of the transmit/receive calibration switch, for coupling the receive antenna array calibration signals sequentially encoded with mutually orthogonal values to the transmit/receive calibration switch, whereby the receive antenna array calibration signals sequentially encoded with mutually orthogonal values are produced at the common port of the transmit/receive calibration switch in a receive antenna array calibration mode of operation. An analog-to-digital converter includes an input port coupled to the common port of the transmit/receive calibration switch, for converting into digital form those analog signals applied to the input port of the analog-to-digital conversion means, to thereby generate a digital version of the transmit antenna array calibration signals sequentially encoded with mutually orthogonal values in the transmit antenna array calibration mode of operation, and a digital version of the receive antenna array calibration signals sequentially encoded with mutually orthogonal values in the receive antenna array calibration mode of operation. A signal processor is coupled to the analog-to-digital converter, for decoding that one of the digital version of the transmit antenna array calibration signals sequentially encoded with mutually orthogonal values and the digital version of the receive antenna array calibration signals sequentially encoded with mutually orthogonal values which is produced by the analog-to-digital conversion means, to thereby generate signals representing the relationship between a bit of each of the phase shifters and the resulting phase.

In a particular version of this embodiment of a calibration system with which the antenna attitude determination method of the invention may be used, each of the first and second signal couplers includes an electromagnetic filter for rejecting unwanted frequencies, to thereby generate filtered signals, and a frequency converter coupled to the filter for frequency converting the filtered signals. In another version, the first and second signal couplers includes a frequency converter, which may be a downconverter.

According to an aspect of the invention, a method provides for determining, in a system in which a tone generator provides a test tone for near-field alignment of the beam-direction control arrangement of a transmit antenna, the pointing direction of the phased-array transmit antenna relative to a remote station, where the phased-array antenna includes a beam-direction control arrangement. The method according to this aspect of the invention includes the steps of generating the test tone for beam pointing determination, and applying the test tone to a port of the transmit antenna. The method also includes the step of controlling at least one of amplitude and phase of the beam-direction control arrangement of the transmit antenna, for generating multiple beams, which may be either sequential or simultaneous. At a remote station, for each of the multiple beams, at least one of amplitude and phase of the tone is or are determined. The pointing direction of the antenna relative to the remote station is determined from the at least one of amplitude and phase of the tone.

DESCRIPTION OF THE INVENTION

Figure 1:
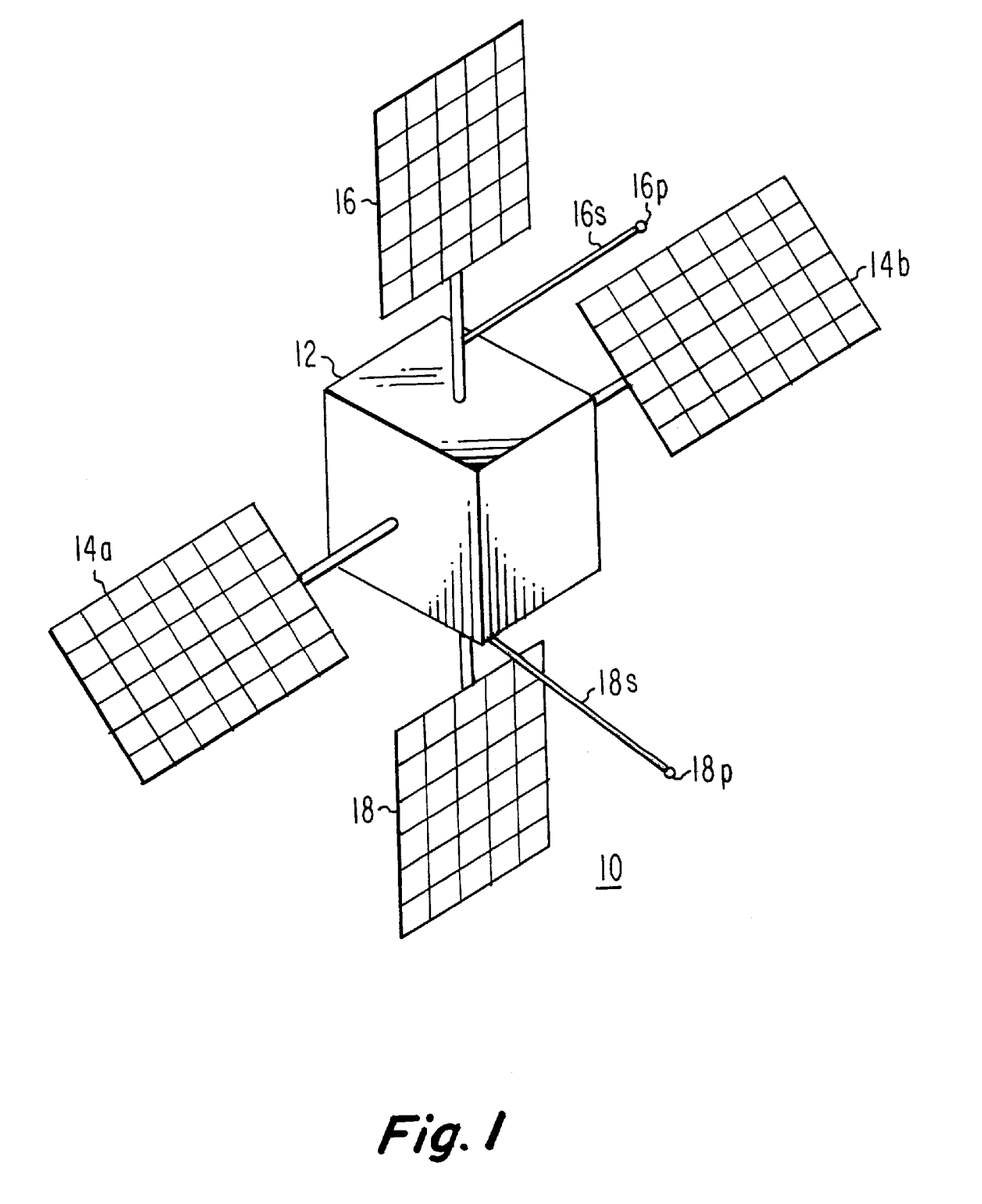
FIG. 1 is a simplified illustration of a spacecraft on which a calibration arrangement with which an antenna attitude determination scheme according to an aspect of the invention may be used.

FIG. 1 is a simplified illustration of a spacecraft on which a calibration arrangement according to an aspect of the invention may be mounted. In FIG. 1, a spacecraft 10 includes a body 12, illustrated as a rectangular block. Body 12 supports first and second solar panels 14a and 14b, which are mounted to track the sun, for producing electricity for powering the various electrical portions of the spacecraft 10. Body 12 of spacecraft 10 also supports an array antenna 16, which may be dedicated to a receiving function. An array antenna 18 is dedicated to a transmitting function. Receiving antenna array 16 is associated with a receive antenna calibration antenna or probe 16p held in a fixed nominal position before receiving antenna array 16 by a support 16s. The nominal position of the probe relative to the associated array 16 is known, so the radius $r_n$ from the probe to any element n of the array 16 is known. Transmit antenna array 18 is associated with a transmit antenna calibration antenna or probe 18p held in a fixed nominal position before transmit antenna array 18 by a support 18s.

Figure 2:
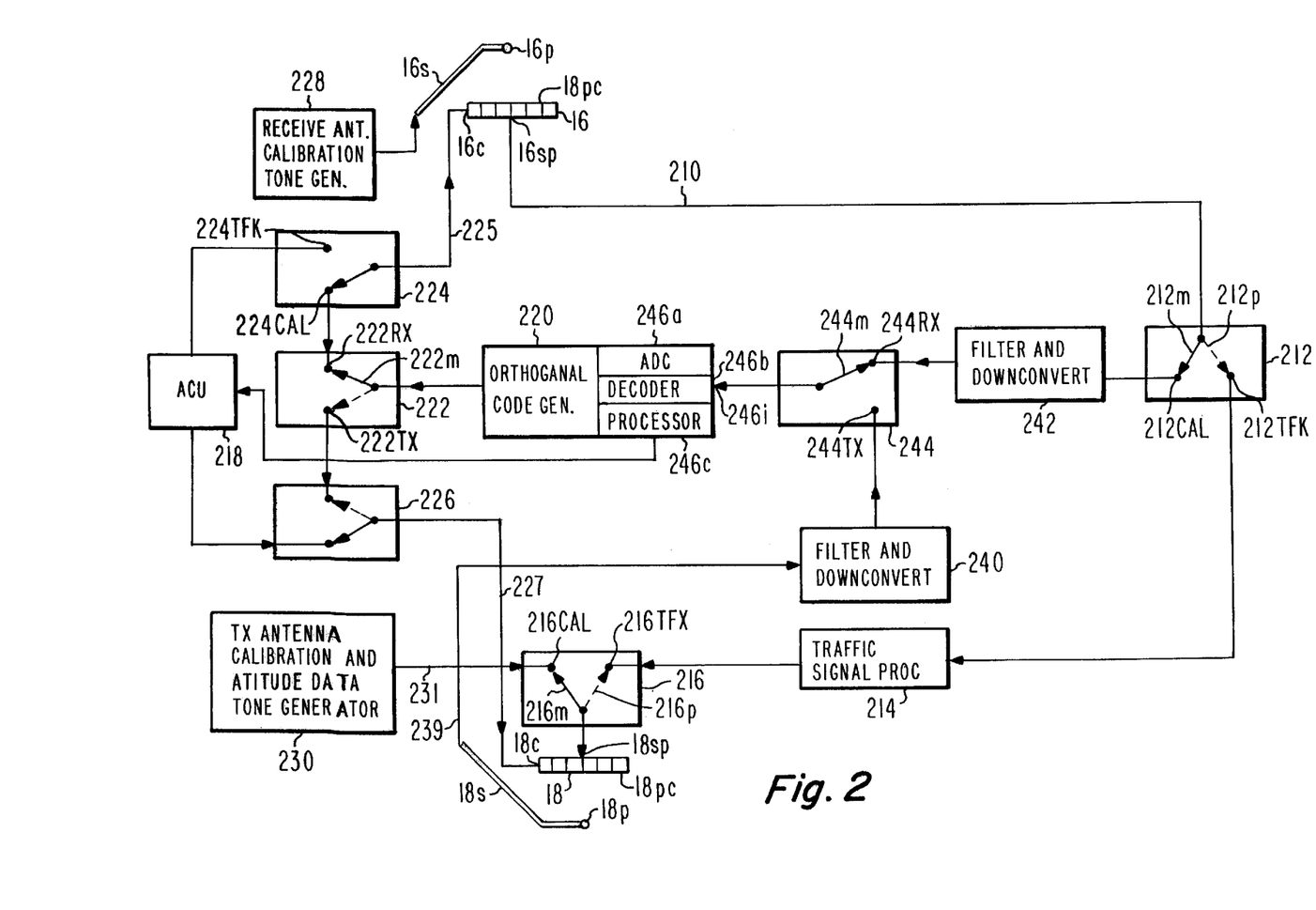
FIG. 2 is a simplified block diagram of various systems associated with the antennas of FIG. 1.

FIG. 2 is a simplified block diagram of various systems associated with antennas 16 and 18 of FIG. 1. In FIG. 2, receive antenna array 16 includes a signal port 16sp, from which signals received by the receive antenna array 16 are coupled to a common movable element 212m of a switch illustrated as 212. Receive antenna array 16 also includes a control or beam conditioning input port 16c, to which digital control signals are applied for control of the state of all of the control elements (phase shifters and attenuators or gain-control amplifiers) of the array. In general, there is one phase shifter and one attenuator for each antenna element of the array 16.

The signals produced at port 16sp of antenna 16 of FIG. 2 are applied to the common port of a switching arrangement illustrated as a mechanical single-pole, double-throw switch 212. Those skilled in the art know that representation of a switch by its mechanical equivalent is for simplicity only, and that electronic switching arrangements are preferred in most applications. Further, those skilled in the art know that the signals may be such as to require many separate switchable paths in order to accomplish the desired switching function, and no further explanation is required. Switch 212 as illustrated includes a movable common element 212m which can be switched between contact with a calibration (CAL) terminal and contact with a traffic (TFK) terminal. The traffic terminal of switch 212 is connected to a traffic signal processing block 214, which performs processing which may be applicable to the traffic signals before transmissions are performed. In one common aspect, processing block 214 represents frequency-shifting of the signals which are to be retransmitted to the Earth, and in one aspect performs routing of signals of various frequencies so that they are applied to selected ports of one or more beamformers (not illustrated) which determine which of several spot (or other shaped) beams carries that particular signal to its destination. The processed signals from block 214 are applied to the traffic (TFK) port of a switching arrangement 216. Switching arrangement 216 includes a common movable element 216m which is switchable to contact either a traffic (TFK) terminal or a calibration (CAL) terminal. The common element 216m is connected to the signal port 18sp of transmit array antenna 18.

In the traffic-handling mode of operation, switch arrangements 212 and 216 are in their alternate positions (the positions indicated by the phantom movable elements 212p and 216p). With the switches 212 and 216 so set, the traffic signals received by receive antenna 16 are coupled through switch 212 to traffic signal processor 214. The resulting processed traffic signals are applied through switch 216 to signal port 18sp of transmit array antenna 18, which transmits the traffic signals to the Earth.

In the described flow of traffic signals, the signals received by receive array antenna 16 are expected to be received from particular regions of the Earth's surface which the beam(s) of the receiving antenna array 16 illuminate under control of beam control signals, generated by an antenna control unit (ACU) illustrated as a block 218, and applied to control signal input port 16c of receiving antenna array 16. The concept of illumination of a region is well known in the antenna arts, and is not further described. Similarly, the signals transmitted by transmit antenna array 18 are intended to illuminate particular region(s) of the surface under the control of the control signals generated by ACU 218 and applied to control signal input port 18c of transmit antenna array 18. In order to assure that the beam direction and or shape as controlled by ACU 218 are those intended, it may be desirable to perform a calibration from time to time in order to determine the actual phase shift imparted by the various phase shifters and or the attenuators of the receive antenna array 16 or the transmit antenna array 18.

In FIG. 2, an orthogonal code generator 220, when enabled, sequentially generates antenna element control signals. These control signals are applied to the movable element m of a switching arrangement (switch) 222, which includes transmit (TX) and receive (RX) terminals. When switch 222 is in the illustrated condition or state, the antenna element control signals produced by orthogonal code generator 220 are applied to control signal input port 16c of receive antenna array 16. A switch 224 is ganged with switch 222, to switch off (prevent the antenna 16 from receiving) the receive antenna array 16 control signals produced by ACU 218 during those intervals in which the encoder control signals are applied to the receive antenna array 16. On the other hand, when switch 222 is in its alternate switching condition or state, illustrated by the phantom position of movable element 222m, the encoder signals are applied by way of switch 222 to the control signal input port 18c of transmit antenna array 18. During those intervals in which switch 222 routes the control signals from orthogonal code generator 220 to control signal input port 18c of transmit antenna array 18, a switch 226, which is ganged with switch 222 for simultaneous actuation therewith, decouples the control signals generated by ACU 218 from the control input port 18c of transmit antenna array 18. Thus, in a calibration mode of operation, depending upon the position of switch arrangement 222 (and of the switches 224 and 226 ganged therewith), the encoding signals generated by orthogonal code generator 220 are coupled to the control signal input port of either the receive antenna array 16 or the transmit antenna array 18.

The signals produced by orthogonal code generator 220 are known signal sets such as those described, for example, in U.S. Pat. No. 5,572,219, issued Nov. 5, 1996 in the name of Silverstein et al., and their application to near-field calibration is described below.

In FIG. 2, a receive antenna array calibration tone generator 228 is connected by way of support 16s to receive antenna array probe or antenna 16p. When generator 228 is enabled, the tone is generated, and radiated by probe 16p. receive antenna array 16 receives the tone, modulated or encoded by the calibration control signal from orthogonal code generator block 220. Thus, the signal produced at receive antenna array signal port 16sp is the receive antenna array calibration tone encoded or modulated with the calibration control signal from orthogonal code generator block 220.

In FIG. 2, a transmit antenna array calibration tone generator 230 is connected to a calibration (CAL) terminal of switch arrangement 216. In the calibration mode of operation, the common movable element 216m of switch 216 makes contact with calibration terminal CAL, and the tone is applied to the signal input port 18sp of transmit antenna array 18. Also in the calibration mode of operation, the control signals produced by orthogonal code generator 220 are applied over switches 222 and 226 (in their alternate positions, indicated by dash lines) to the control input port 18c of transmit antenna array 18. As a result of the application of the control signal to control signal input port 18c, the transmit calibration tone applied as radiated by transmit antenna array 18 is encoded with or modulated by the signal generated by orthogonal code generator 220. The modulated or encoded transmitted signal is received by probe 18p and coupled by way of a transmission line extending through support 18s to a receiver arrangement 240, which may be as simple as a filter for excluding unwanted signals, a downconverter, or a cascade of a filter with a downconverter.

The received signals from blocks 240 and 242 are applied to a switching arrangement 244, which is illustrated as including a receive (RX) terminal, a transmit (TX) terminal, and a common movable element 244m. In the RX position of switch 244, the encoded or modulated calibration signal from the receive antenna array 16 is coupled to a block 246a, and in the TX position of switch 244, the encoded or modulated calibration signal from the transmit antenna array 18 is coupled to block 246a. Block 246a represents an analog-to-digital converter for converting the analog signals into digital form, block 246b represents a decoder, and block 246c represents a processor, for decoding the encoded or modulated calibration signals, and for determining the phase shifts and or attenuations represented by the various bits of the control signals. The resulting information is applied over a signal path represented as 248 to the antenna control unit 18, to update the ACU with current phase shift and attenuation values.

Figure 3:
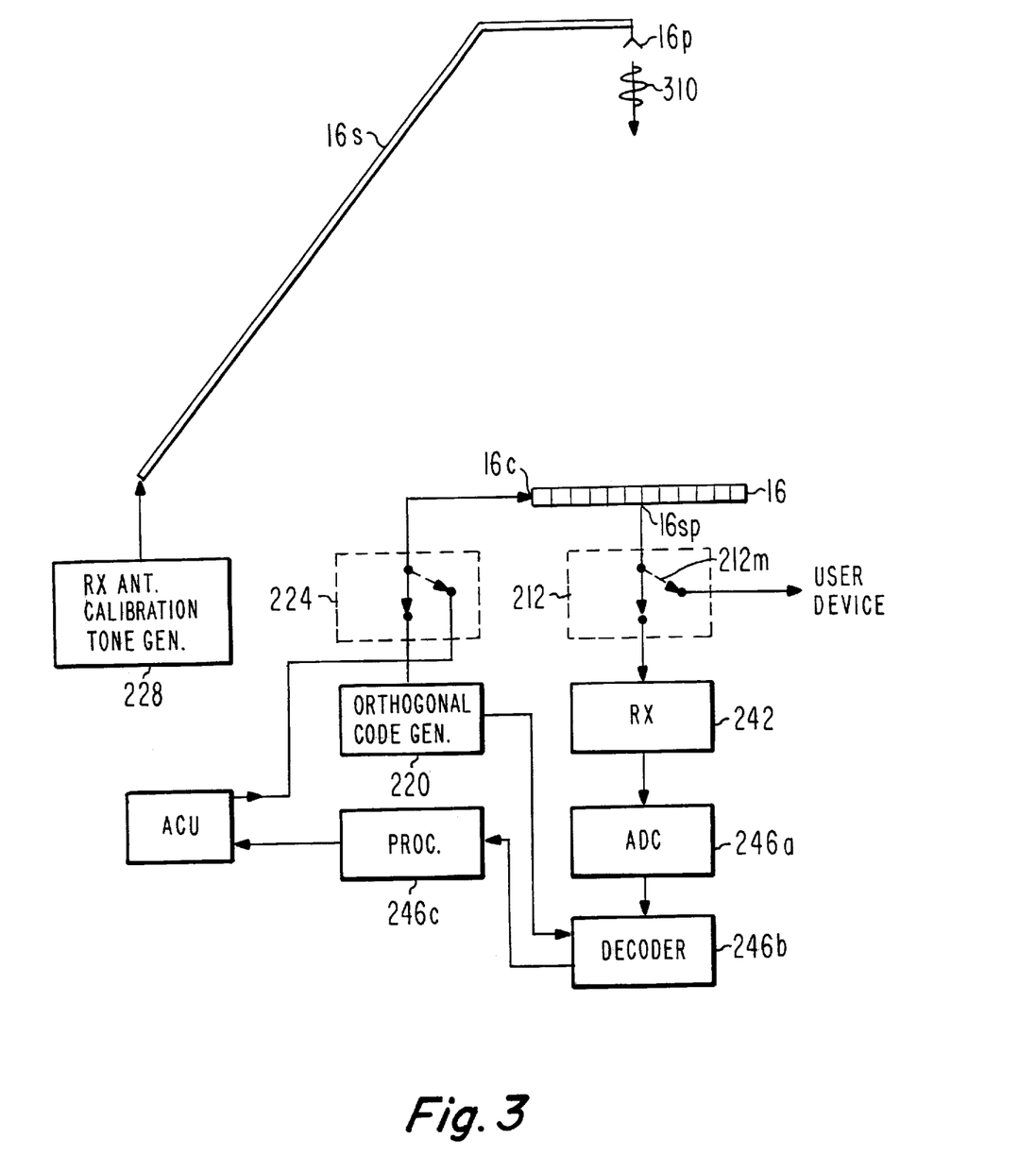
FIG. 3 is a simplified diagram in block and schematic form of an receive antenna array calibration scheme with which an array antenna attitude or beam pointing method may be used according to an aspect of the invention.

The arrangement of FIG. 3 is particularly advantageous for use on a spacecraft, because the signal-to-noise ratio can be favorable by comparison with remote arrangements in which the calibration signal source is on the Earth. Also, the on-board calibration scheme allows the antenna to be tested on the Earth before launch of the spacecraft. Also, the arrangement of FIG. 2 re-uses parts of the calibration structure, which is advantageous in a spacecraft context.

FIG. 3 is a simplified diagram in block and schematic form of an receive antenna array calibration scheme, with which a phased-array antenna attitude determination or beam direction determination method may be used in accordance with an aspect of the invention. In essence, the arrangement of FIG. 3 is a subset of the arrangement of FIG. 2, lacking the transmit antenna array calibration arrangement. In FIG. 3, elements corresponding to those of FIG. 2 are designated by like reference numerals. In FIG. 3, the signal from receive block 242 is coupled to an ADC block 246a, which converts the analog signals into digital form (if necessary). The digital signals are applied to a decoder block 246b, which decodes the signals. The processor of block 246c determines, from the decoded signals, the phase shift or attenuation values which the elemental phase shifters or attenuators take on in response to the various bits of the control signal. As in the arrangement of FIG. 2, the tone generator 228 couples a calibration tone signal to near-field probe or antenna 16p, which transmits the tone, as suggested by photon symbol 310. The receiving antenna array 16 receives the signal from antenna or probe 16p, together with traffic signals (if any) from other sources, and modulates the received signal in accordance with the control signals applied to control signal input port 16c. The modulated received signals are produced at signal port 16sp. In a traffic mode of operation, movable element 212m of switch 212 couples the received signals to a user device (not illustrated). In a calibration mode of operation, switch 212 couples the modulated tone to receiver 242. As in the arrangement of FIG. 2, orthogonal code generator 220 produces appropriate orthogonal signal streams, which, when coupled to control input port 16c by switch 224 in a calibration mode, cause the received signal (the tone and the traffic signals) at port 16sp to be modulated with the coding. The signals so received are applied to receiver 242, and the received signals are coupled to a decoder 246a. The decoded signals are applied to the processor 246b, which produces signals representing the values of the phase shifts associated with each phase bit value of the control signal, the attenuation associated with each attenuation bit value of the control signal, or both. These signals are made available over a signal path 248 to an ACU 218. In a traffic mode of operation, the ACU control signals are coupled over switch 224 to the control input port 16c of receive antenna array 16.

The arrangement of FIG. 3 for near-field calibration of the phase of the phase shifters, amplitude controllers, or both, which are associated with each of the elements of the receive array 16, provides an improvement over the abovementioned technique described by Silverstein et al., because the Silverstein technique is a far-field measurement, and as such requires a remote transmitter or receiver, together with coherent synchronization and timing, which is difficult to perform over substantial distances. The use of a near-field probe allows the calibration to be performed in a simpler manner. Knowledge of the radiation patterns of the individual elements of the array, and their locations in the array and relative to the probe, allow the computation of correction factors. These correction factors are then used to correct or calibrate the near-field measurements to determine the far-field radiation patterns which result from various phase or amplitude controller settings. These correction factors would apply to either a receive phased-array antenna as in FIG. 3, a transmit phased-array antenna as in FIG. 4a, or both. Put another way, the near-field probe measurements are used to determine far-field results, so that the phase-shifter and amplitude-controller settings associated with the array elements, which give the desired far-field radiation patterns, can be determined. Once the phase shifter and amplitude controller settings have been determined or normalized to given far-field patterns, the array is calibrated. Details of the calibration technique are described below in conjunction with FIG. 4b.

Figure 4A:
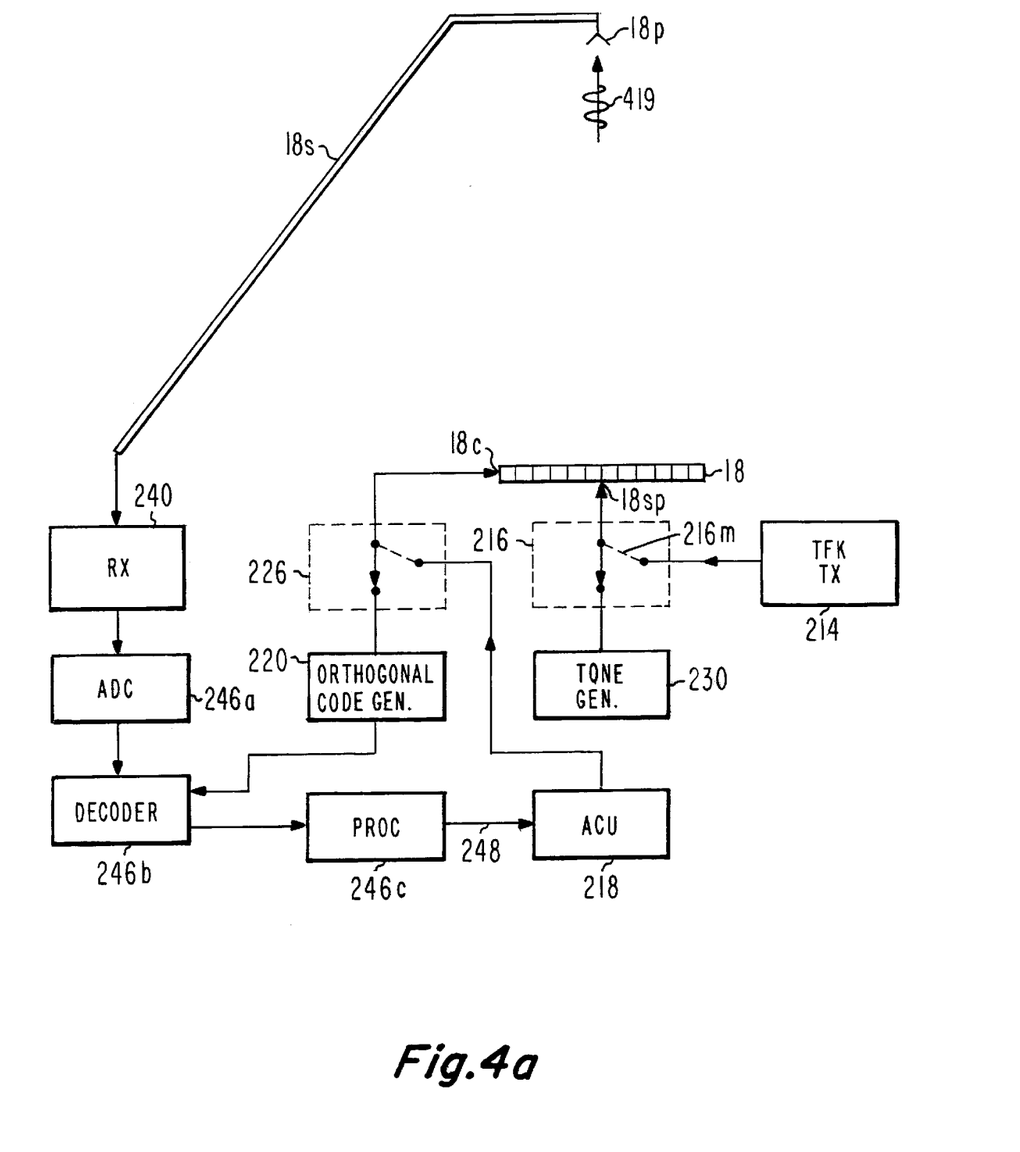
FIG. 4a is a simplified diagram in block and schematic form of an transmit antenna array calibration scheme.

In FIG. 4a, tone generator 230 couples unmodulated calibration signals to signal port 18sp of transmit antenna array 18 by way of switch 216 in a calibration mode of operation. Transmit antenna array 18 also receives coded signals at its control signal input port 18c by way of switch 226 in its calibration position. The coding applied to the control signal input port 18c of antenna 18 causes modulation of the calibration tone from generator 230, so that a modulated tone is transmitted, as suggested by photon symbol 410, to near-field probe antenna 18p. The encoded signal is received by probe 18p, and coupled to receiver 240. Receiver 240 provides processing as described above, and couples the received signals to decoder 246a. Decoder 246b decodes the signals, and the decoded signals are applied to processor 246c. Processor 246c determines the values of the phase shifts associated with each phase bit value of the control signal, the attenuation associated with each attenuation bit value of the control signal, or both. These signals are made available over a signal path 248 to an ACU 218. In a traffic mode of operation, the ACU control signals are coupled over switch 224 to the control input port 16c of receive antenna array 16.

These control signals, when applied to the control input port 16c or 18c of the receive antenna array or the transmit antenna array, respectively, modulate or encode the calibration tones.

Figure 4B:
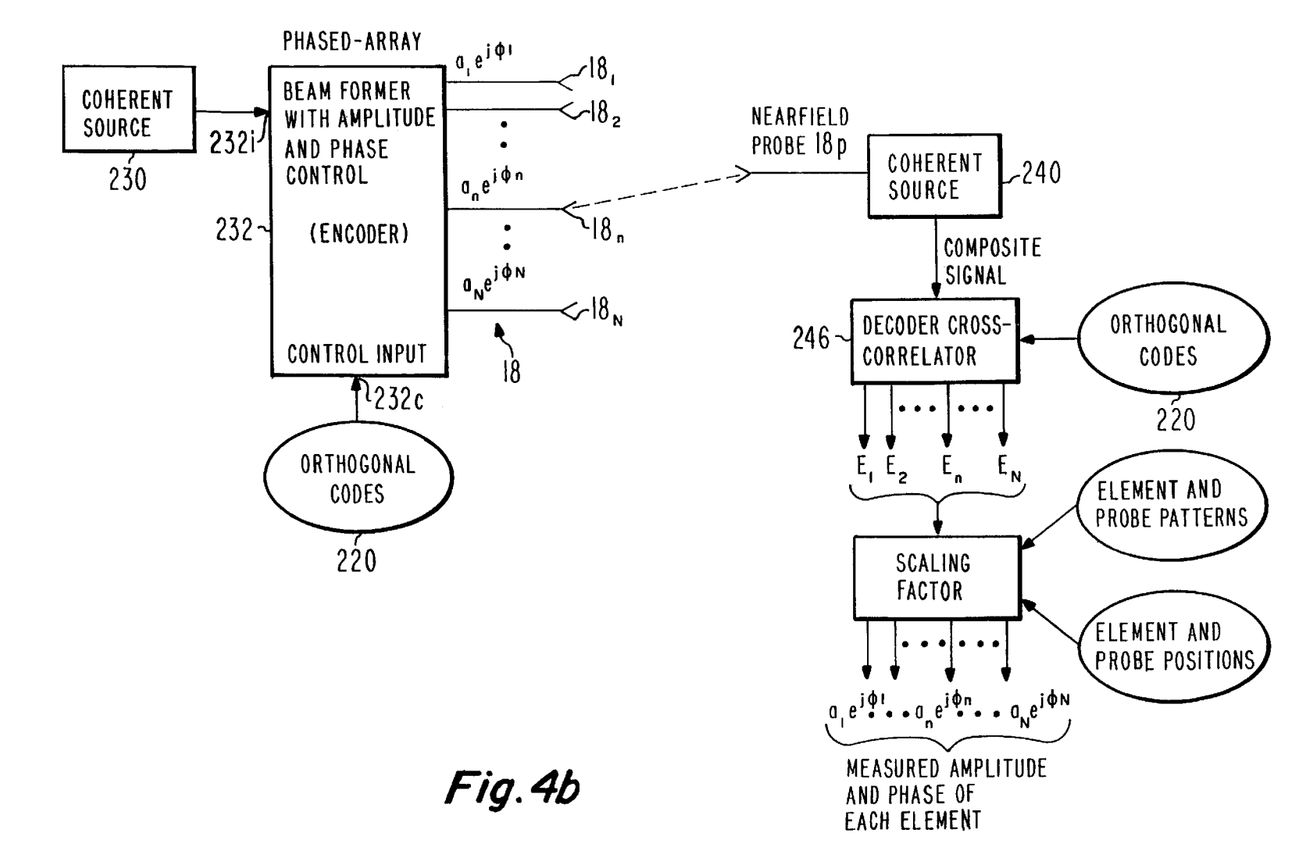
FIG. 4b is a simplified block of a transmit calibration scheme showing the signals used to obtain amplitude and phase measurements of the phased-array elements.

FIG. 4b is a simplified functional diagram illustrating the operation of the arrangement of FIG. 4a for near-field calibration. In FIG. 4b, coherent source 230 applies an unmodulated tone to a common port of a beamformer 232 which is associated with array antenna 18. Beamformer 232 also includes a control input port 232c. The orthogonal codes as suggested by Silverstein et al. are applied to control input port 232c of beamformer 232 from orthogonal code generator or source 220. The orthogonal codes individually modulate the various phase shifters and amplitude controllers with separately identifiable codes, so that the signals applied to the various elemental antennas $18_1, 18_2, \ldots, 18_n, \ldots, 18_N$ of the array are encoded with signals which may be designated $a_1 e^{j\sigma 1}, a_2 e^{j\sigma 2}, \ldots, a_N e^{j\sigma N}$, respectively. Put another way, the various paths between the common input port 232i and each of the individual antenna elements $18_1, 18_2, \ldots, 18_n, \ldots, 18_N$ of array 18 are modulated with different codes, so that a unique coding sequence is applied to each of the element paths, by toggling at least one of amplitude and phase so as to provide a unique identifier for the signal path. The near-field probe 18p of FIG. 4b receives the radiated signals from each elemental antenna $18_1, 18_2, \ldots, 18_n, \ldots, 18_N$ of the array 18 with a phase and amplitude which depends upon the separation $r_n$ between the individual elemental antennas and the probe, and the angular separation as it affects the radiation patterns of the elemental antennas and the probe. The signals received by the probe are applied to coherent receiver 240, and the resulting signal, which is a composite of all of the individual signals from the individual elemental antennas of the array, are applied to decoder 246. Decoder 246 also receives the orthogonal code information, so that the individual elemental signals can be extracted from the composite signal. The resulting unprocessed signals are designated $E_1, E_2, \ldots, E_n, \ldots, E_N$. Each of these signals represents one of the signals flowing in an independent path extending between one of the various individual antenna elements $18_1, 18_2, \ldots, 18_n, \ldots, 18_N$ of array antenna 18 and the near-field probe 18p. Consequently, the unique coding sequence applied to each of the element paths allows for simultaneous measurement of all of the elements of the phased-array antenna. More specifically, each of the signals has its relative amplitude and phase $a_n e^{jk0n}$ encoded with the orthogonal coding sequence. The procedure for using a Hadamard matrix to generate the orthogonal encoding and decoding sequences is described in the abovementioned Silverstein et al. patent. The processing of the signals received by the probe is performed by cross-correlating the received signal with the orthogonal codes, to produce the unprocessed signals $E_1, E_2, \ldots, E_n, \ldots, E_N$. The complex weights are given by $$E_n = a_n e^{jk\phi_n} \frac{g_n(\alpha_n^e) f(\alpha_n^p) \exp(jkr_n)}{r_n} \qquad 1$$

where:

$r_n$ is the distance between the $n^{th}$ element and the probe; k is the wave number $2\pi/\lambda$; $g_n(\alpha_n^e)$ are the element patterns; $\alpha_n^e$ defines the angle relating the element pattern to the probe position; $f(\alpha_n^p)$ is the probe pattern; and $\alpha_n^p$ defines the angle relating the probe pattern to the element position.

The a priori knowledge of the element patterns, the probe pattern, and the relative locations or positions of the various elements are used to compute a scaling factor $S_n$ given by $$S_n = \frac{r_n \exp(-jkr_n)}{g_n \alpha_n^e f(\alpha_n^p)} \qquad 2$$

The relative amplitude and phase weights are then recovered using $$a_n e^{jk0n} = S_n E_n \qquad 3$$

The recovered amplitude and phase weights for each of the elements of the antenna array are then used in conventional manner to calibrate the array, and to provide for correction of the far-field pattern.

The receive array of FIG. 3 is calibrated in a manner corresponding to that of the transmit antenna of FIG. 4a, by applying the coherent tone source to the transmitting probe, and the receiver/decoder at the output port of a beamformer associated with the receive antenna. In calibration of the receive antenna array, the encoding is performed in the receive beamformer, and the same coherent reception, decoding, and scaling procedure is performed to recover the relative phase and amplitude for each element of the receive antenna array.

It should be noted that, in practice, the determination of the radiation patterns of the various elemental antennas of the array may require actual measurements of elements located at representative positions in the array, as for example at the center and at the edges. Similarly, actual measurements may be required in order to determine the radiation pattern of the probe antenna.

Figure 5:
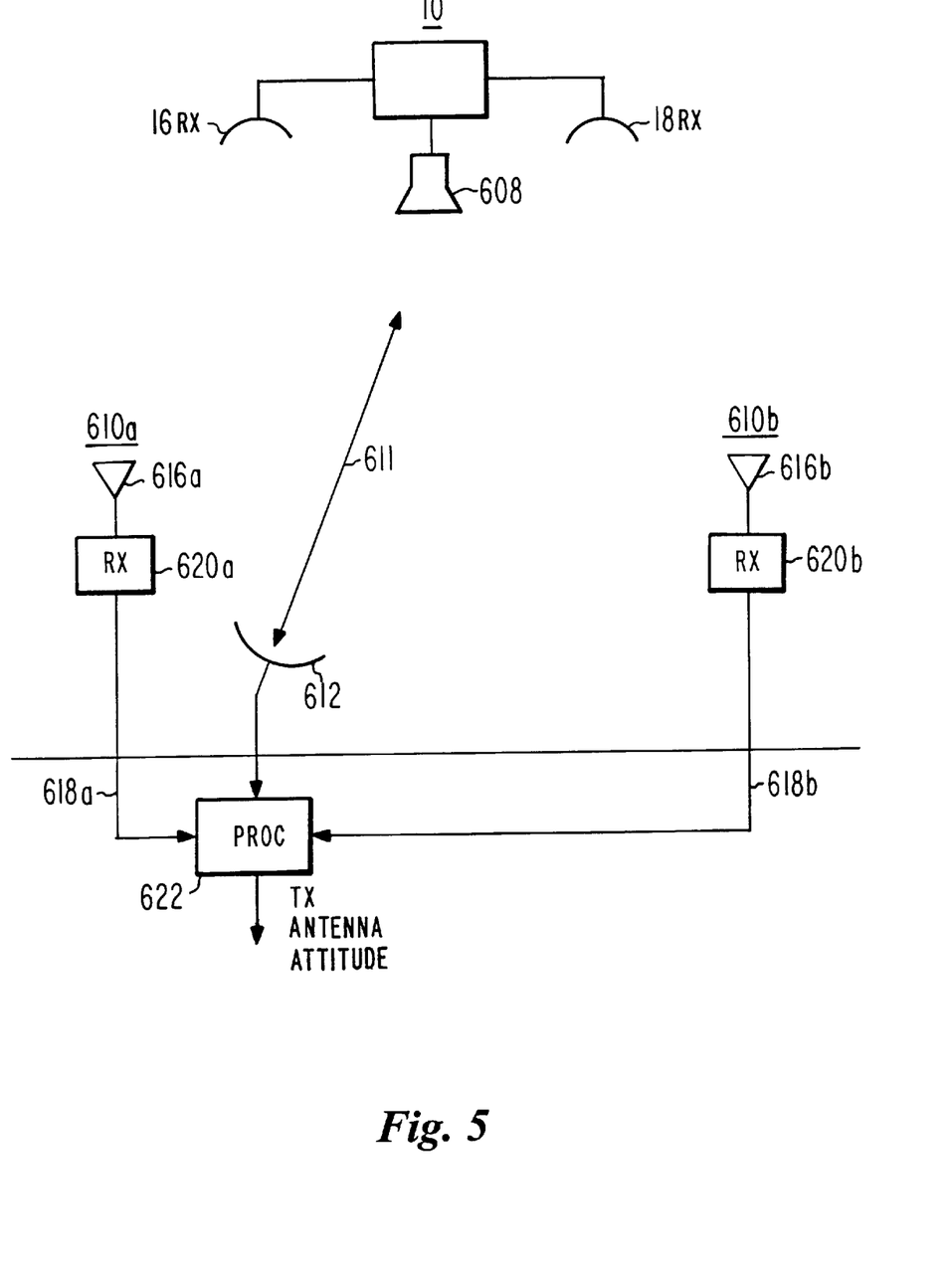
FIG. 5 is a simplified block diagram of a spacecraft including the beam direction control calibration arrangement as described in conjunction with FIGS. 1 through 5, together with ground stations which receive the transmitted signal, for aiding in determining the beam direction or pointing of the transmit antenna.

FIG. 5 is a simplified block diagram of a spacecraft including the beam direction control calibration arrangement as described in conjunction with FIGS. 1 through 5, together with ground stations which receive the transmitted signal, for aiding in determining the beam direction or pointing of the transmit antenna of the spacecraft. In FIG. 5, the spacecraft 10 includes array transmit antenna 18, as described above. A first ground station 610a includes a receiving antenna 616a and a receiver 620a, which receives signals transmitted from transmitting antenna 18 of the spacecraft. A second ground station 616b includes a receive antenna 616b and a receiver 620b. In a mode of operation for determining the pointing direction of the transmit antenna 18, the pointing direction in two dimensions can be determined from the information obtained at either ground station, but determination of the three-axis pointing direction requires information obtained at a minimum of two separated sites.

Since the transmit antenna is illustrated as being located on a spacecraft, which may be in motion relative to the ground stations, it may be necessary, or at least practical, to provide separate synchronization scheme, rather than relying on accurate clocks at each location. Such a scheme is illustrated in FIG. 5 by a synchronizing-signal transmit antenna 608, which transmits timing signals, by way of a path designated 611, to at least one ground antenna, illustrated as an antenna 612.

As illustrated in FIG. 5, the information from the two ground stations 610a and 610b is coupled, by paths 618a and 618b, to a processor 622, which can perform some of the processing to determine the three-axis pointing direction of the transmit antenna 18. As mentioned above, if only two-direction pointing is required, information from only one ground station is required, and the additional information, as from ground station 610b, in not needed.

In operation of the system of either FIG. 2 or FIG. 4a for determination of beam pointing direction, transmit antenna calibration tone generator 230 produces the desired test tone, which is applied to port 18sp of the transmit antenna. This tone does not need to be modulated with the Hadamard information which is required for antenna control unit calibration as described above, but may be modulated or unmodulated, just so long as the signal as transmitted can be received by at least one ground station of FIG. 5. If the transmit antenna 18 generates multiple simultaneous beams, and these beams can be separately accessed, as by different frequencies of the test tones, the beams may be simultaneous. In the case of a transmit antenna which produces a single beam at a time, the beams defined by the state of the antenna control unit must be time-sequenced, but in either case, beams pointing in various directions must "impinge" on ground station 610a of FIG. 5. It should be emphasized that the antenna beam shapes are well defined by the settings of the phase and amplitude controllers of the transmit antenna. At the ground station or ground stations of FIG. 5, at least the amplitude or phase, or both, of the received signals of each beam is (are) determined, with the aid of the synchronization information transmitted from antenna 608.

The processing required to determine the beam pointing direction from the signals arriving at the ground station(s) of FIG. 5 is straightforward. A ground station receives multiple pieces of information about each beam. Taking a simplistic example, if a beam is sequenced to locations which should be centered on a ground station, the signals received at the ground station for each beam should be of equal amplitude. Any systematic difference in attitude can be interpreted as a deviation of the "center" around which the beams are sequenced, and this difference is the antenna pointing offset or attitude offset. Much more sophisticated processing can be performed, but is beyond the scope of this invention.

The receive antenna attitude or pointing determination is made in a similar manner to that described above for the transmit antenna. More particularly, a ground or other remote station(s) transmits a tone, which is received by the receiving antenna (16 of FIG. 2). The position of the beam generated by the receive antenna is rotated about an axis centered on the remote site, and the amplitude and or phase of the received signal are determined for various beam directions. If the amplitudes and or phases are constant, then the beam is centered on the remote transmission site, then the beam direction is known. If the amplitude and or phases deviate from a constant value in the various beams, the deviations are indicative of the beam pointing error, and the processor determines the angular error. A complete determination of the pointing in three dimensions can be established with two or more separated remote transmission sites.

Other embodiments of the invention will be apparent to those skilled in the art. For example, while the embodiment of FIG. 2 performs calibration on only one of the receive and transmit antennas at a time, this is because a single transmit and single receive antenna have been illustrated. If there were plural transmit and receive antennas, some transmit antennas could be calibrated at the same time receive antennas were being calibrated. Those skilled in the art know that the meaning of the term "between" in electrical systems may be different from the meaning in physical arrangements, and must be interpreted in accordance with the relevant art area. While the near-field calibration invention as described is mounted on a spacecraft, it may instead be used with terrestrial antennas. While a single probe has been described as being used in conjunction with each antenna being calibrated, more than one may be used if desired. Those skilled in the art know that other methods may be used for generating sets of orthogonal coding sequences required for simultaneous measurements of the multiple antenna elements. While the described calibration arrangement is particularly advantageous for use in conjunction with phased-array antennas mounted on spacecraft, it may be used on any kind of phased-array antenna.

A near-field calibration system (FIGS. 3 or 4) calibrates at least one of (either or both of) the phase and amplitude controllers of the individual elements of an phased antenna array (16, 18). The phased antenna array (16, 18) includes a signal port (16sp, 18sp) for each antenna beam which is generated, and also includes a control signal input port (16c, 18c) to which control signals may be applied for control of the phase and amplitude controllers. The phased antenna array (16, 18) can be operated in a normal signal-handling or traffic mode and in a calibration mode. A calibration probe (16p, 18p) is held at a fixed location relative to the phased antenna array (16, 18), and within the near-field of the phased antenna array (16, 18). A calibration tone generator (228, 230) generates a calibration tone signal. The calibration tone generator (228, 230) is (a) coupled to at least one of the signal ports (16sp, 18sp) of the phased antenna array (16, 18) for the case in which the phased antenna array (16, 18) is used as a transmit antenna during normal operation, or is (b) coupled to the calibration probe (16p, 18p) for the case in which the phased antenna array (16, 18) is used as a receive antenna during normal operation. A calibration encoder or orthogonal code generating arrangement (220) is coupled to the beam conditioning control port (16c, 18c) of the phased antenna array (16, 18), for, during calibration, sequentially setting at least some of the phase shifters (or attenuators, or both) of the phased antenna array (16, 18) with a plurality of sets of values. Each of the sets of values set by the orthogonal code generating arrangement (220) imposes a coding on the calibration tone signal, to thereby sequentially generate calibration signals encoded with sets of values. Each set of values so encoded onto the calibration signals is orthogonal to other sets of values with which the calibration signals are encoded. As a result, in the case in which the phased antenna array (16, 18) is used as a transmit antenna during normal operation, the calibration probe (16p, 18p) receives the calibration tone signals sequentially encoded with mutually orthogonal values, and in the case in which the phased antenna array (16, 18) is used as a receive antenna during normal operation, the calibration tone signals sequentially encoded with mutually orthogonal values are generated at the at least one of the signal port (16sp, 18sp)s of the phased antenna array (16, 18). The system includes a decoder (246; 246b) for decoding signals encoded with the mutually orthogonal values, for generating decoded signals therefrom. An encoded signal coupling arrangement (18s, 240, 244m) is (a) coupled to the calibration probe (18p) and to the decoder (246; 246b) in the case in which the phased antenna array (18) is operated as a transmit antenna in the normal mode of operation and (b) coupled to the decoder (246; 246b) and to the signal port (16sp) of the phased antenna array (16) in the case in which the antenna is operated as a receive antenna in the normal mode of operation, for coupling the encoded signals to the decoder (246; 246b). Consequently, the decoder (246; 246b) generates decoded signals. A processor (246, 246c) is coupled to the decoder (246; 246b), for processing the decoded signals, for generating signals representing at least values of one of phase shift and attenuation, or both if appropriate. A coupling arrangement (248) is coupled to the processor (246, 246c) and to the antenna control unit (218), for coupling to the antenna control unit (218) the signals representing at least the values of phase shift, attenuation, or both, which may have been determined by the calibration system.

An antenna system according to another aspect, avatar, embodiment, hypostasis, incarnation, manifestation, mode, motif, objectification, or phase of the invention (FIG. 2) includes an transmit antenna array (18) including a signal port (18sp) and also including a beam conditioning signal control input port (18c) coupled to at least controllable phase shifters (18pc) of the transmit antenna array (18). A transmit calibration probe (18p) is affixed at a nominal location in the near field of the transmit antenna array (18). A transmit antenna switching arrangement (216) includes at least common (216m), calibration (216CAL), and transmit (216TFK) ports, with the common port (216m) being coupled to the signal port (18sp) of the transmit antenna array (18). The antenna system includes a source (230) of transmit antenna array (18) calibration signals. A transmit antenna array (18) calibration signal coupling arrangement (231) is coupled to the source (230) of transmit antenna array (18) calibration signals and to the calibration port (216CAL) of the transmit antenna switching arrangement (216), for controllably coupling the transmit antenna array (18) calibration signals to the signal port (18sp) of the transmit antenna array (18), so that the transmit antenna array (18) calibration signal, when applied to the signal port (18sp) of the transmit antenna array (18), is transmitted by the transmit antenna array (18). A calibration orthogonal code generator or encoder (220) sequentially generates sets of values, each set of values being orthogonal to other sets of values. A transmit antenna encoding signal coupling arrangement (222TX, 226, 227) is coupled to the calibration orthogonal code generator or encoder (220) and to the beam conditioning control signal port (18c) of the transmit antenna array (18), for, during calibration, coupling the calibration encoding signals to the beam conditioning control signal port (18c) of the transmit antenna array (18). This results in sequentially setting at least some of the phase shifters (18pc) of the transmit antenna array (18) with the plurality of sets of values, as a result of which, or whereby, the transmit antenna array (18) calibration probe (18p) receives the transmit antenna array (18) calibration signals sequentially encoded with mutually orthogonal values. The antenna system also includes an receive array antenna (16). The receive array antenna (16) includes a signal port (16sp) and also includes a beam conditioning signal control input port (16c) coupled to at least controllable phase shifters (16pc) of the receive array antenna (16). A receive calibration probe is affixed at a nominal location in the near field of the receive antenna array (16). A receive antenna switching arrangement (212) includes at least common (212m), calibration (212CAL), and receive (212TFK) ports. The common port (212m) of the receive antenna switching arrangement (212) is coupled (by path 210) to the signal port (16sp) of the receive antenna array (16). A source (228) of receive antenna array calibration signals is provided. An receive antenna array calibration signal coupling arrangement (16s) is coupled to the source of receive antenna array calibration signals (228) and to the receive calibration probe (16p), for controllably coupling the receive antenna array calibration signals to the receive calibration probe (16p), as a result of which, or whereby, the receive antenna array calibration signal is transmitted by the receive calibration probe (16p) and is received by the receive antenna array (16). A receive antenna encoding signal coupling arrangement (222m, 224, 225) is coupled to the calibration orthogonal code generator or encoder (220) and to the beam conditioning control signal port (16c) of the receive antenna array (16), for, during calibration, sequentially setting at least some of the phase shifters (16ps) of the receive antenna array (16) with the plurality of sets of values, whereby the receive antenna array (16) produces, at its signal port (16sp), receive antenna array calibration signals sequentially encoded with mutually orthogonal values. A transmit/receive calibration switch (244) including transmit signal port (244TX), receive signal port (244RX), and a common port (244m), couples to its common port (244m) signals applied to one of its transmit signal port (244TX) and its receive signal port (244RX). A first encoded signal coupling arrangement (18s, 239, 240) is coupled to the transmit calibration probe (18p) and to the transmit signal port (244TX) of the transmit/receive calibration switch (244), for coupling the transmit antenna array (18) calibration signals sequentially encoded with mutually orthogonal values to the transmit/receive calibration switch (244), as a result of which, or whereby, the transmit antenna array (18) calibration signals sequentially encoded with mutually orthogonal values are produced at the common port (244m) of the transmit/receive calibration switch (244) in an transmit antenna array (18) calibration mode of operation. A second encoded signal coupling arrangement (242) is coupled to the calibration port (212CAL) of the receive antenna switching arrangement (212) and to the receive port (244RX) of the transmit/receive calibration switch (244), whereby the receive antenna array calibration signals sequentially encoded with mutually orthogonal values are produced at the common port (244m) of the transmit/receive calibration switch (244) in an receive antenna array calibration mode of operation. An analog-to-digital converter (246ADC) includes an input port (246i) coupled to the common port (244m) of the transmit/receive calibration switch (244), for converting into digital form those analog signals applied to the input port (246i) of the analog-to-digital converter (246ADC), to thereby generate a digital version of the transmit antenna array (18) calibration signals sequentially encoded with mutually orthogonal values in the transmit antenna array (18) calibration mode of operation and a digital version of the receive antenna array calibration signals sequentially encoded with mutually orthogonal values in the receive antenna array calibration mode of operation. A signal processor (246b, 246c) is coupled to the analog-to-digital converter (246a), for decoding that one of the digital version of the transmit antenna array (18) calibration signals sequentially encoded with mutually orthogonal values and the digital version of the receive antenna array calibration signals sequentially encoded with mutually orthogonal values which is produced by the analog-to-digital converter (246ADC), to thereby generate signals representing the relationship between each bit applied to each of the phase shifters and the resulting phase of the phase shifters.

In a particular version of this system, each of the first encoded signal coupling arrangement (18s, 239, 240) and the second encoded signal coupling arrangement (242) comprises an electromagnetic filter for rejecting unwanted frequencies, to thereby generate filtered signals, a frequency converter, or both. The frequency converter may be a downconverter. A traffic signal processor (214) may be coupled between the receive (212TFK) port of the receive antenna switching arrangement (212) and the transmit (216TFK) port of the transmit antenna switching arrangement (216).

What is claimed is:

1. A method for determining the pointing direction of a phased-array transmit antenna relative to a remote station, where said phased-array antenna includes a beam- direction control arrangement, in a system in which a tone generator provides a test tone for near-field alignment of said beam-direction control arrangement of said transmit antenna, said method comprising the steps of:

generating said test tone for beam pointing determination, and applying said test tone to a port of said transmit antenna:

controlling at least one of amplitude and phase of said beam-direction control arrangement of said transmit antenna for generating multiple beams;

at a remote station in the case of a transmit antenna, determining, for each of said multiple beams, at least one of amplitude and phase of said tone;

from said at least one of amplitude and phase of said tone, determining the pointing direction of said antenna relative to said remote station.

2. A method according to claim 1, wherein said step of controlling at least one of amplitude and phase of said beam-direction control arrangement of said antenna for generating multiple beams includes the step of controlling at least one of amplitude and phase of said beam-direction control arrangement of said antenna for generating time-sequential beams.

3. A method for operating a phased-array transmit antenna in first and second modes, where said first mode includes near-field calibration of the beam-direction control arrangement of said antenna, and said second mode includes determination of the pointing direction of said antenna relative to a remote site, said method comprising the steps of:

in said first mode of operation, producing a test tone, and applying said test tone to a port of said transmit antenna, for generating a transmitted test tone;

in said first mode of operation, applying modulating signals to said beam-direction control arrangement of said antenna, for modulating said transmitted test tone, for generating a modulated transmitted test tone;

in said first mode of operation, receiving said modulated transmitted test tone at a near-field probe, to thereby form received modulated test tone;

in said first mode of operation, processing said received modulated test tone in conjunction with said modulating signals, for calibrating said beam-direction control arrangement;

in said second mode of operation, producing said test tone, and applying said test tone to a port of said transmit antenna, for generating a transmitted test tone;

in said second mode of operation, receiving said transmitted test tone at a remote site to thereby define a remote received signal, and determining at least one of the amplitude and phase of said remote received signal;

in said second mode of operation, determining from said at least one of said amplitude and phase of said remote received signal the pointing direction of said transmit antenna relative to said remote site.

4. A method for determining the beam pointing direction of a phased-array receiving antenna including a beam direction control input port and a received signal port, in a system in which said beam direction input port of said phased-array receiving antenna is coupled to a beam-direction control arrangement, and said phased-array receiving antenna is associated with a near-field calibration system including a calibration tone generator coupled to a near-field probe for radiating a tone to said receive antenna, an orthogonal code generator coupled to said beam direction control input port for encoding the tone produced by said receive antenna at said received signal port, an orthogonal code decoder coupled to said received signal port and to said orthogonal code generator, for decoding said tone as encoded for thereby allowing the signals received by the individual elements of the receive antenna array to be separated, and a processor coupled to said decoder, for generating calibration signals representative of the relative phases and amplitudes of said individual elements, said method comprising the steps of at a remote station, transmitting a test tone toward said receive antenna;

at said receive antenna, receiving said tone;

controlling at least one of amplitude and phase of said beam-direction control arrangement of said receive antenna for generating multiple beams;

at a location close to said receive antenna, determining, for each of said multiple beams, at least one of amplitude and phase of said tone;

from said at least one of amplitude and phase of said tone, determining the pointing direction of said antenna relative to said remote station.

* * * * *